US008239090B2

(12) United States Patent
De Lagny et al.

(10) Patent No.: US 8,239,090 B2
(45) Date of Patent: Aug. 7, 2012

(54) METHOD FOR CONTROLLING THE OPERATING CONDITION OF A VEHICLE BASED ON AN ONBOARD DIAGNOSTIC STRATEGY DEFINING DIFFERENT TYPES OF FAILURES

(75) Inventors: Joseph Regnard De Lagny, La Norville (FR); Abdelmalik Belaid, Paris (FR)

(73) Assignee: Renault S.A.S., Boulogne Billancourt (FR)

( * ) Notice: Subject to any disclaimer, the term of this patent is extended or adjusted under 35 U.S.C. 154(b) by 1036 days.

(21) Appl. No.: 12/097,171

(22) PCT Filed: Nov. 29, 2006

(86) PCT No.: PCT/FR2006/051253
§ 371 (c)(1),
(2), (4) Date: Aug. 6, 2008

(87) PCT Pub. No.: WO2007/068837
PCT Pub. Date: Jun. 21, 2007

(65) Prior Publication Data
US 2009/0030570 A1    Jan. 29, 2009

(30) Foreign Application Priority Data

Dec. 13, 2005 (FR) ..................................... 05 12625

(51) Int. Cl.
*G06F 7/00* (2006.01)
(52) U.S. Cl. ..................................... 701/29.2; 701/29.1
(58) Field of Classification Search ................. 701/29.1, 701/29.2
See application file for complete search history.

(56) References Cited

U.S. PATENT DOCUMENTS

| 6,076,172 | A | 6/2000 | Kimura et al. | |
|---|---|---|---|---|
| 6,141,608 | A * | 10/2000 | Rother | 701/33 |
| 6,580,975 | B2 * | 6/2003 | Lovelace et al. | 701/19 |
| 6,718,238 | B1 * | 4/2004 | Laguer-Diaz et al. | 701/33 |
| 7,373,226 | B1 * | 5/2008 | Cancilla et al. | 701/29 |
| 7,551,993 | B1 * | 6/2009 | Cancilla et al. | 701/29 |
| 2002/0077782 | A1 | 6/2002 | Fruehling et al. | |
| 2005/0015380 | A1 | 1/2005 | Burkhardt et al. | |
| 2007/0055420 | A1 * | 3/2007 | Krzystofczyk et al. | 701/29 |

FOREIGN PATENT DOCUMENTS

WO    2005 012713    2/2005
WO    2005 068262    7/2005

* cited by examiner

*Primary Examiner* — Paul N Dickson
*Assistant Examiner* — Nicole Verley
(74) *Attorney, Agent, or Firm* — Oblon, Spivak, McClelland, Maier & Neustadt, L.L.P.

(57) ABSTRACT

A method for controlling an operating condition of a vehicle including executing, at each of operating cycles, at least one diagnostic phase applied to at least one computer controlling an operating condition of the vehicle, during which the computer produces and consumes data, at least one of the data capable of taking a particular predetermined value resulting from detection of an operating failure by the computer, so as to indicate a diagnostic result associated with the failure. The method stores, at the end of each cycle, the particular value for the failure concerned and initializes the diagnostic phase at the beginning of the next operating cycle with the stored particular data so as to reproduce, for the failure concerned, the diagnostic result supplied by the diagnostic phase when it was last executed.

14 Claims, 1 Drawing Sheet

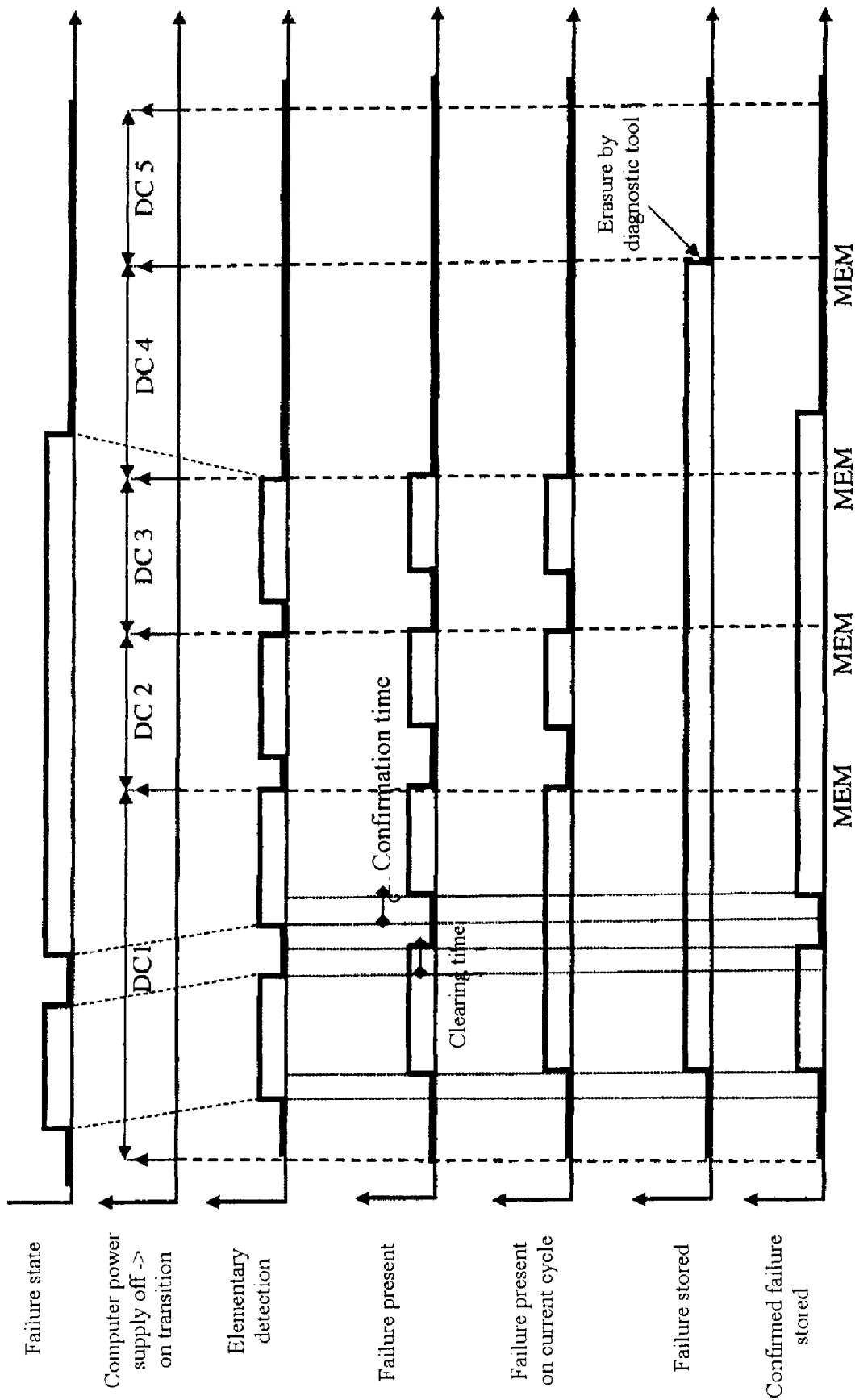

METHOD FOR CONTROLLING THE OPERATING CONDITION OF A VEHICLE BASED ON AN ONBOARD DIAGNOSTIC STRATEGY DEFINING DIFFERENT TYPES OF FAILURES

BACKGROUND

The present invention relates to a method of monitoring the operation of a vehicle, for example a motor vehicle, using an onboard diagnostic system of at least one electronic computer among the electronic computers for monitoring the operation of the vehicle.

A motor vehicle conventionally comprises a plurality of onboard electronic computers, when appropriate connected to sensors and actuators, to perform various vehicle operation monitoring functions, such as monitoring the engine injection system, monitoring an automatic gearbox, managing vehicle links to the ground (braking, suspension, etc.), and so on.

To ensure the safety of the users faced with a possible operating fault detected on a component or a system relating to the operation of a vehicle and to allow for it to be repaired by a garage mechanic, the onboard computers of the self-diagnostic systems make it possible to implement various electrical or functional diagnostic strategies.

These diagnostic strategies can be applied permanently (as is the case, for example, with electrical continuity diagnostics) or in specific operating conditions (as is the case with functional diagnostics, for example diagnostics of the supercharging system or of the catalytic conversion efficiency of the exhaust gas post-treatment system).

The function of these diagnostic strategies is to provide the computer with failure information, with which is associated a status (for example "present", "absent").

The computer then uses this failure information and the associated status information to apply strategies of reconfiguration (use, for example, of a replacement value when a sensor fails) and/or of degraded mode operation (for example, limitation of the engine performance if a failure of the supercharging system is detected).

These strategies aim, in strictly descending order, to guarantee the safety of the users and of the environment, to ensure the reliability of the hardware and to minimize the impact felt by the user.

Most of the current onboard diagnostic systems consider four possible states for the failures, briefly described below:

"failure absent": this status indicates that, for the last result supplied by the onboard diagnostic strategy on the current operating cycle, there is no failure. Typically, when the system is initialized at the start of a new vehicle usage cycle, the status of all the possible failures take this value.

"failure present": this status indicates that, for the last diagnostic result supplied by the onboard diagnostic strategy on the current operating cycle, there is a failure. This failure state is not designed to be stored on the loss of power supply at the end of a vehicle usage cycle.

"failure stored": this status indicates that since the last time the fault memory of the computer concerned was erased by an external diagnostic tool, the failure has been detected at least once. This status does not relate to the current operating cycle and can therefore be added to the two previous states. Thus, a failure can be absent and stored, or present and stored. This stored failure state is in fact intended for logging purposes.

"OBD confirmed failure": this status relates to the failures of the OBD scope, in other words the "onboard diagnostic" (OBD) type system, compliant with the ISO 14 230-4 standard, intended to monitor the emissions of pollutants, by detecting the probable origin of a malfunction, that is, a failure of a component or of a system relating to the emissions, which results in the emission limits set down according to international standards being exceeded. The onboard diagnostic system OBD can therefore relate to several computers of one and the same motor vehicle, possibly having an influence on the emissions of pollutants, such as the engine monitoring computer or that of the automatic gearbox.

According to the ISO 14229-UDS (Unified Diagnostic Services) standard, the definitions of the above states are complemented by the following states:

"failure present on operating cycle": this status is identical to the "failure present" status, but is maintained until the end of the operating cycle.

"OBD failure present on the running cycle and/or on the preceding one": this status corresponds to a failure undergoing OBD confirmation.

The abovementioned standard also generalizes to all failures the concept of "readiness", previously used for the failures of the OBD scope, to indicate, in the form of binary information, whether the diagnostic strategy concerned has been performed or not, based on two levels of information: on the operating cycle and since the last time the fault memory of the computer was erased by an external diagnostic tool.

The duly defined information provides, on the one hand, effective help in repairing any failures and, on the other hand, makes it possible to manage most of the reconfigurations and/or degraded modes needed in the event of failure.

However, the failure states supplying the diagnostic results for the failures concerned, as used for most of the motor vehicle operation monitoring systems, do not always allow for total observance of the above-mentioned objectives, namely guaranteeing the safety of users and the environment, guaranteeing the reliability of the hardware and minimizing the impact on the environment.

In particular, when a new vehicle usage cycle is started, the onboard diagnostic system of each computer initializes all the abovementioned failure states, apart from the stored failures. More specifically, a computer assumes, at the start of each new vehicle usage cycle, that all of the onboard diagnostic system is in the nominal state. Also, the information relating to the last diagnostic performed before the loss of power supply cannot be recovered for the next usage cycle.

At the start of a new cycle, the system cannot therefore apply any reconfiguration or any degraded operating mode, even if a failure is physically present on the vehicle. This situation will remain true as long as the first diagnostic phase proper is not executed and the failure concerned is not redetected by the system.

Consequently, if a physical failure remains, the onboard diagnostic system, from its initialization to the new detection of this failure, will operate in a "pseudo-nominal" state, that is, without any reconfiguration and/or degraded mode strategy being applied, which can induce risks of additional degradations, even safety risks for the users and/or the environment.

As an example, the detection of a fuel leak requires, for reasons of reliability of the diagnostic strategy, the system to operate for a minimum time (detection time) in a given operating mode (detection zone). The diagnostic can therefore be applied only after several minutes of operation and/or kilometers traveled. Thus, when a leak has been detected during a vehicle usage cycle, it would be desirable, from the start of the next running cycle, to be able to inform the driver thereof by an appropriate means (lighting of an indicator, for example) without, for this, it being necessary to wait for the diagnostic strategy to be executed for this new usage cycle, all the more so as the vehicle can have multiple users, who do not necessarily know the history of the previous running cycles.

The use of the "failure stored" state is also not suited to the effect of reproducing the last diagnostic result for a failure concerned at the start of a subsequent usage cycle. Indeed, this state for a failure concerned is irreversible and therefore requires the vehicle to be returned to a garage for erasure. Now, the fact that many failures can self-repair (for example a temporary mechanical blockage of a component) or possibly be repaired by the user himself (for example reconnection of a sensor) must be taken into account. Since the "failure stored" state is generally irreversible from one cycle to another, it could not therefore allow the system to return to the nominal mode if the failure concerned was no longer detected.

BRIEF SUMMARY

The aim of the present invention is to remedy these drawbacks by proposing a monitoring of the operation of a system using at least one electronic computer provided with onboard diagnostic strategies, guaranteeing the system an operation compliant at all times with the best possible knowledge of its failure state.

The solution is based on the definition of a new failure state which is representative of the last diagnostic result, independently of the losses of power supply between consecutive usage cycles.

The subject of the invention is therefore a method of monitoring the operation of a vehicle comprising the execution, on each vehicle usage cycle, of at least one diagnostic phase applied to at least one computer out of the electronic computers for monitoring the operation of the vehicle, during which said computer produces and consumes data, at least one of said data items being able to assume a particular predetermined value following the detection of an operating failure by said computer, so as to indicate a diagnostic result associated with said failure, said method being characterized in that it comprises the storage, at the end of each cycle, of said particular value for the failure concerned and the initialization of the diagnostic phase at the start of the next usage cycle with said particular stored value so as to reproduce, for said failure concerned, said diagnostic result supplied by the diagnostic phase when it was last executed.

Advantageously, the initialization of the diagnostic phase having to be applied to the next usage cycle comprises the application, at the start of said cycle and before the execution of said diagnostic phase, of an adapted operating mode of the vehicle according to said particular stored value for the failure concerned.

According to one characteristic, the application of an adapted operating mode consists in applying a strategy for reconfiguring an operating parameter corresponding to the detected presence of the failure.

According to another characteristic, the application of an adapted operating mode consists in applying a degraded mode strategy of the operation of the vehicle corresponding to the detected presence of the failure.

Advantageously, once the diagnostic phase has been executed for the next usage cycle, if the diagnostic result associated with said failure indicates the absence of said failure, said method comprises the return to a normal operating mode of the vehicle.

Advantageously, once the diagnostic phase has been executed for the next usage cycle, if the diagnostic result associated with said failure confirms the presence of said failure, said method comprises the maintenance of the adapted operating mode.

Preferably, the method according to the invention is applied to monitoring the operation of the drive train of a motor vehicle.

BRIEF DESCRIPTION OF THE DRAWINGS

Other characteristics and advantages of the present invention will become more clearly apparent from reading the following description, given by way of illustrative and non-limiting example and with reference to the following single FIGURE:

FIG. 1, in which the timing diagrams illustrate the behavior of various failure states defined by the ISO 14229 standard, compared to the behavior of a new failure state on which the present invention is based.

DETAILED DESCRIPTION

FIG. 1 therefore illustrates the solution retained by the present invention by describing the behavior of some usual failure states, such as those defined by the ISO 14229 standard, and the behavior of a particular failure state called "stored confirmed failure", the object of which is specifically to reproduce, for a particular failure, the diagnostic result supplied the last time the diagnostic phase was executed, independently of the loss of power supply.

The usual failure states described in the context of the example of FIG. 1 comprise the "failure present", "failure present stored on the current cycle" and "failure stored" states. There is also an "elementary detection" state, representative of the behavior of an unconsolidated elementary diagnostic.

Thus, according to the example, on the first usage cycle DC1, a failure is detected by the system, as indicated by the transition of the "failure state" signal to the high state. The "elementary detection" signal then also changes to the high state, indicating that a failure has been detected, but not yet confirmed.

After a predetermined confirmation time, if the "elementary detection" signal is still in the high state, the failure is then considered to be confirmed and the "failure present" failure state signal changes to the high state, indicating that there is a failure on the current operating cycle. At the same time, the "failure present on the current cycle" failure state signal for the failure concerned also changes to the high state. This status signal is therefore identical to the "failure present" signal, except that it is designed to be maintained in its high state once the failure has been detected to the end of the current cycle DC1. Thus, once a failure has been detected on the current cycle, the "failure present on the current cycle" signal for the failure concerned is not allowed to return to its nominal state.

The "failure stored" state is also raised to the high state for logging purposes to indicate that the failure concerned has been detected at least once and is designed to maintain this state until the fault memory of the computer concerned is erased by an external diagnostic tool.

Finally, the new "stored confirmed failure" failure state as defined by the present invention also changes to the high state once the detected failure has been confirmed.

During the first operating cycle DC1, the failure previously detected disappears, whether because it was a false detection or because it was self-repaired for example. This new situation is described by the transition of the "failure state" signal to the low state. The behavior of this signal then reflects on the behavior of the "elementary detection" signal which changes to the low state. In the same way as the detection of the presence of the failure had to be confirmed before influencing the "failure present" failure state signal, the detection of the absence of this failure must also be confirmed. This detection therefore does not influence the behavior of the "failure present" failure state signal, until after a predetermined time, called clearing or end of confirmation time. When this time has elapsed, the "failure present" signal therefore changes to the low state. The "failure present on the current cycle" and "failure stored" signals do not undergo any change of state at this stage as explained previously.

However, the "stored confirmed failure" signal adopts the same behavior as the "failure present" signal and changes to the low state indicating that the failure is no longer apparent.

Then, still during the same operating cycle DC1, the failure is detected again, as indicated by the second transition of the "failure state" signal to the high state, which results in a modification of the behavior of the "elementary detection", "failure present" and "stored confirmed failure" signals according to the same principle as explained previously on first detection of the failure on the current operating cycle DC1. The failure is this time confirmed detected until the end of the current cycle DC1.

At the end of the operating cycle DC1, the failure is therefore still present.

The "stored confirmed failure" state is then, for the failure concerned, stored (MEM) in a non-volatile memory of the computer concerned, so as to be able to be repeated on initialization of the onboard diagnostic system on the next usage cycle DC2 and so reproduce, for the failure concerned, the diagnostic result produced by the diagnostic strategy on its last occurrence.

On the next usage cycle DC2, the "failure present" and "failure present on the current cycle" failure states are conventionally initialized to retrieve their nominal state, except for the "failure stored" logging state. Consequently, a computer provided with a diagnostic strategy which is based only on these failure states would then be led to assume, at the start of the new usage cycle DC2, that all the system is effectively in the nominal state, despite the fact that the detected failure present at the end of the preceding usage cycle DC1 remains.

Thus, thanks to the new "stored confirmed failure" stored state, which reproduces, for the failure concerned, the last diagnostic result produced on the preceding cycle DC1, the computer knows, from the start of the new usage cycle DC2, that the failure is present.

According to this aspect of the invention, the computer can therefore, from the start of the new cycle DC2 and even before the execution proper of the diagnostic phase, apply the appropriate reconfiguration or the most suitable degraded mode (maintenance of the degraded mode corresponding to the detected presence of the failure, alert to the driver or particular strategy).

Then, once the diagnostic phase is reached, the computer can then apply the most suitable strategy according to the last diagnostic result as supplied by the "failure present" failure state.

Thus, if the result of the diagnostic confirms that the failure is still present, as illustrated in the example of FIG. 1 where the failure is still detected present during the operating cycle DC2, the reconfiguration or the degraded mode previously applied at the start of the cycle before the first occurrence of the diagnostic strategy is reached, in accordance with the stored information supplied by the "stored confirmed failure" failure state, is maintained.

If, conversely, the result of the diagnostic no longer reveals a failure, as is the case during the operating cycle DC4 of FIG. 1, the reconfiguration or the degraded mode previously applied in accordance with the stored information supplied by the "stored confirmed failure" failure state, is renounced and there is a return to the nominal operating mode of the vehicle.

Thus, the operation of the system is permanently in accordance with the best possible knowledge of its failure state.

The invention can be applied to the monitoring systems of the drive train of a motor vehicle. It can generally be applied to any system using an electronic computer provided with onboard diagnostic strategies and, in particular, to any computer onboard any road vehicle.

The invention claimed is:

1. A method of monitoring operation of a vehicle, comprising:
   executing, on each of a vehicle usage cycle, at least one diagnostic phase applied to at least one computer out of electronic computers for monitoring an operation of the vehicle, during which the computer produces and consumes data items, at least one of the data items able to assume a particular predetermined value following detection of an operating failure by the computer, so as to indicate a diagnostic result associated with the failure; and
   storing at the end of each vehicle usage cycle a particular value indicative of the failure concerned and initializing a diagnostic phase at a start of a next vehicle usage cycle with the particular stored value so as to reproduce, for the failure concerned, the diagnostic result supplied by the diagnostic phase when it was last executed.

2. The method as claimed in claim 1, wherein the initializing the diagnostic phase having to be applied to the next usage cycle comprises applying, at the start of the cycle and before the execution of the diagnostic phase, an adapted operating mode of the vehicle according to the particular stored value for the failure concerned.

3. The method as claimed in claim 2, wherein the applying the adapted operating mode applies a strategy for reconfiguring an operating parameter corresponding to a detected presence of the failure.

4. The method as claimed in claim 2, wherein the applying the adapted operating mode applies a degraded mode strategy of the operation of the vehicle corresponding to a detected presence of the failure.

5. The method as claimed in claim 2, wherein once the diagnostic phase has been executed for the next usage cycle, if the diagnostic result associated with the failure indicates absence of the failure, the method further comprises a return to a normal operating mode of the vehicle.

6. The method as claimed in claim 2, wherein once the diagnostic phase has been executed for the next usage cycle, if the diagnostic result associated with the failure confirms presence of the failure, the method further comprises maintaining the adapted operating mode.

7. The method as claimed in claim 1, applied to a monitoring operation of a drive train of the vehicle.

8. A method of monitoring operation of a vehicle comprising:
   detecting a first change in a vehicle failure state using at least one computer during at least one diagnostic phase of a first vehicle usage cycle;
   confirming the first change in the vehicle failure state using the at least one computer;

defining a first data value corresponding to a first vehicle state resulting from the first change in the vehicle failure state;

storing the first data value in a first non-volatile memory, wherein the first data value stored in the first non-volatile memory can only be changed by a subsequent confirmed detection of a second change in the vehicle failure state; and initializing operation of the vehicle at a beginning of a second vehicle usage cycle using the first data value stored in the first non-volatile memory.

9. The method of claim 8, further comprising:

storing the first data value in a second non-volatile memory, wherein the first data value stored in the second non-volatile memory can only be changed by a diagnostic tool external to the at least one computer.

10. The method of claim 8, further comprising:

detecting a second change in the vehicle failure state using the at least one computer, wherein the second change in the vehicle failure state occurs subsequent to the first change in the vehicle failure state;

confirming the second change in the vehicle failure state using the at least one computer;

defining a second data value corresponding to a second vehicle state resulting from the second change in the vehicle failure state; and replacing the first data value stored in the first non-volatile memory with the second data value.

11. The method of claim 10, further comprising:

changing an operation mode of the vehicle based upon the first data value substituted for the detected but unconfirmed second vehicle failure state upon the beginning of the second vehicle usage cycle.

12. The method of claim 8, further comprising:

substituting the first data value stored in the first non-volatile memory for a value associated with a detected but unconfirmed vehicle state upon the beginning of the second vehicle usage cycle.

13. The method of claim 8, wherein the first change in the vehicle failure state relates to a drive train of the vehicle.

14. The method of claim 8, further comprising:

changing an operation mode of the vehicle based upon the first data value as an initialization value at the beginning of the second vehicle usage cycle.

* * * * *